US007497144B2

(12) United States Patent
Yoon

(10) Patent No.: US 7,497,144 B2
(45) Date of Patent: Mar. 3, 2009

(54) BRAKE PEDAL STRUCTURE

(75) Inventor: Jung-Yong Yoon, Busan Metropolitan (KR)

(73) Assignee: Hyundai Motor Company, Seoul (KR)

( * ) Notice: Subject to any disclaimer, the term of this patent is extended or adjusted under 35 U.S.C. 154(b) by 723 days.

(21) Appl. No.: 10/987,555

(22) Filed: Nov. 12, 2004

(65) Prior Publication Data

US 2005/0103151 A1 May 19, 2005

(30) Foreign Application Priority Data

Nov. 13, 2003 (KR) ...................... 10-2003-0080131

(51) Int. Cl.
*B60T 7/04* (2006.01)
*G05G 1/32* (2008.04)

(52) U.S. Cl. ........................... 74/512; 74/560; 180/271; 180/274

(58) Field of Classification Search ................... 74/512, 74/560; 280/294, 784; 180/271, 274
See application file for complete search history.

(56) References Cited

U.S. PATENT DOCUMENTS 1,464,905 A * 8/1923 Grafenstatt .................. 74/512
5,848,558 A * 12/1998 Isono et al. .................. 74/512
6,041,674 A * 3/2000 Kato ........................... 74/512
6,070,488 A * 6/2000 Yabusaki et al. .............. 74/512
6,142,036 A * 11/2000 Mizuma et al. ............... 74/512
6,176,340 B1 * 1/2001 Mizuma et al. ............. 180/274
6,336,376 B1 * 1/2002 Lee ............................ 74/512
6,408,711 B1 * 6/2002 Mizuma et al. ............... 74/512
6,742,411 B2 * 6/2004 Aoki et al. .................... 74/512
6,810,766 B2 * 11/2004 Mizuma ...................... 74/512
7,066,047 B2 * 6/2006 Amano et al. ................. 74/512

FOREIGN PATENT DOCUMENTS

JP 11-198775 7/1999

* cited by examiner

*Primary Examiner*—Richard WL Ridley
*Assistant Examiner*—Thomas Diaz
(74) *Attorney, Agent, or Firm*—Morgan, Lewis & Bockius LLP

(57) ABSTRACT

A brake pedal structure according to an embodiment of the present invention includes a pedal hanger fixed to a dash panel, a brake pedal whose upper end is pivotally installed directly at the pedal hanger via a pin, a release bracket fixed to a fixing bracket mounted on to a cowl cross bar, a mounting bracket fixed at an upper surface of the pedal hanger, an upper portion of the mounting bracket being placed between the fixing bracket and the release bracket; a triangular link having a right-angled triangular shape configuration, and a linear link whose lower end is pivotally connected to corner of vertical side of the triangular link, an upper end of the linear link being pivotally and releaseably coupled to the pin, and the linear link being configured to separate from the pin when a vehicle collision occurs.

9 Claims, 4 Drawing Sheets

BRAKE PEDAL STRUCTURE

CROSS-REFERENCE TO RELATED APPLICATIONS

The present application is based on, and claims priority from, Korean Application Serial Number 10-2003-0080131, filed on Nov. 13, 2003, the disclosure of which is hereby incorporated by reference herein in its entirety.

FIELD OF THE INVENTION

The present invention relates to a brake pedal structure of a vehicle adapted to minimize injury to a driver's ankle during vehicle crashes by preventing the brake pedal from being pushed toward the driver.

BACKGROUND OF THE INVENTION

Generally, a brake pedal is pivotally secured via a pin to a pedal hanger that is fixed to a dash panel. Therefore, when a driver depresses the brake pedal, the pedal pushes the push rod of the booster (connected to the master cylinder) to allow the master cylinder to generate hydraulic pressure in order for the brake of a vehicle to operate.

When a head-on collision takes place, the driver usually forcibly depresses the brake pedal to rapidly stop the vehicle. Impact from the front of the vehicle is transmitted to the driver's foot via the brake pedal, causing severe injury to the driver's ankle.

In a major vehicle collision, the dash panel is pushed toward the passenger compartment and the brake pedal moves closer to the driver, effectively increasing the impact and aggravating injury to the driver's ankle.

SUMMARY OF THE INVENTION

Embodiments of the present invention are provided to reduce impact transmitted to a driver's ankle during a vehicle collision, thereby minimizing or preventing injury to the driver's ankle.

A brake pedal structure of a vehicle for preventing ankle injury comprises a pedal hanger fixed to a dash panel. The upper end of a brake pedal is pivotally installed at the pedal hanger via a pin. A release bracket is fixed via bolts and nuts to a fixing bracket, which is welded to a cowl cross bar. A mounting bracket is fixed at the upper surface of the pedal hanger. The upper surface of the mounting bracket is placed between the fixing bracket and release bracket. A triangular link has a right-angled triangular shape configuration. The right-angled corner of the triangular link is pivotally connected to a push rod of a booster while the corner of the horizontal side of the triangular link is pivotally connected to the brake pedal. The lower end of a linear link is pivotally connected to the corner of the vertical side of the triangular link, and the upper end of the linear link is pivotally fixed to the pin, which fixes the upper end of the brake pedal to the pedal hanger. The linear link is configured to separate from the pin when a vehicle collision occurs.

In a further embodiment, a brake pedal structure comprises a pedal hanger defining a first pivot point. A pedal pivotally supported at a first end at the first pivot point defines a second pivot point between the first end and a second end. A triangle link defining three pivot points is arranged in a right triangle configuration, wherein the right angle pivot point is forward and the acute angle points are rearward and upward. The rearward pivot point is pivotally secured to the second pivot point on the pedal. A pushrod is configured for cooperation with a vehicle braking system, extending forward, and pivotally secured to the right angle pivot point of the triangle link. A linear link having upper and lower ends, wherein the lower end is pivotally secured to the upward pivot point of the triangle link and the upper end is configured with a rearwardly open semi-circle connection that is pivotally received around the first pivot point and releasable in response to forward rotation of the linear link upper end.

In another embodiment, the pedal bracket is configured for mounting to a vehicle structure such that the pedal hanger is pushed rearward in response to a frontal impact. The rearward push causes disengagement of the linear link from the first pivot point to permit rotation of the triangle link. The linear link includes a protrusion above the pedal hanger at the linear link upper end. A release bracket configured to be fixed to the vehicle structure cooperates with the protrusion to disengage the linear link from the pivot point.

BRIEF DESCRIPTION OF THE DRAWINGS

For a better understanding of the nature and objects of the present invention, reference should be made to the following detailed description read in conjunction with the accompanying drawings, in which.

DETAILED DESCRIPTION OF A PREFERRED EMBODIMENT

Figure 1:
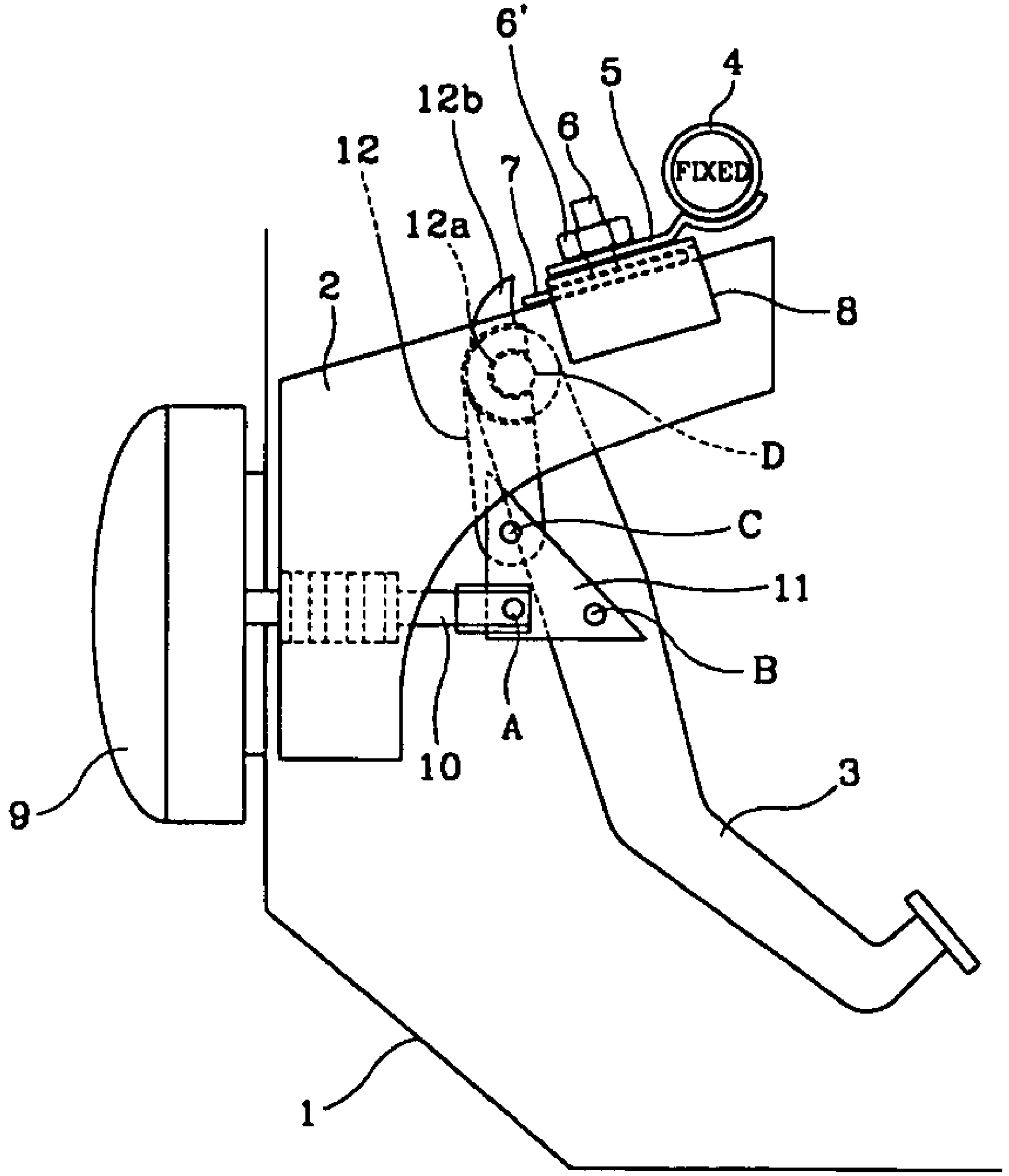
FIG. 1 illustrates a brake pedal structure according to an embodiment of the present invention.

Referring to FIG. 1, the upper end of a brake pedal 3 is pivotally secured via a pin positioned at pivot point D to an upper middle portion of a pedal hanger 2. The pedal hanger 2 is fixed to a dash panel 1.

A cowl cross bar 4 whose both ends are fixed to the vehicle body is connected at a bottom surface thereof with a fixing bracket 5. This connection may be a weld. The fixing bracket 5 is formed with bolt holes.

Figure 3:
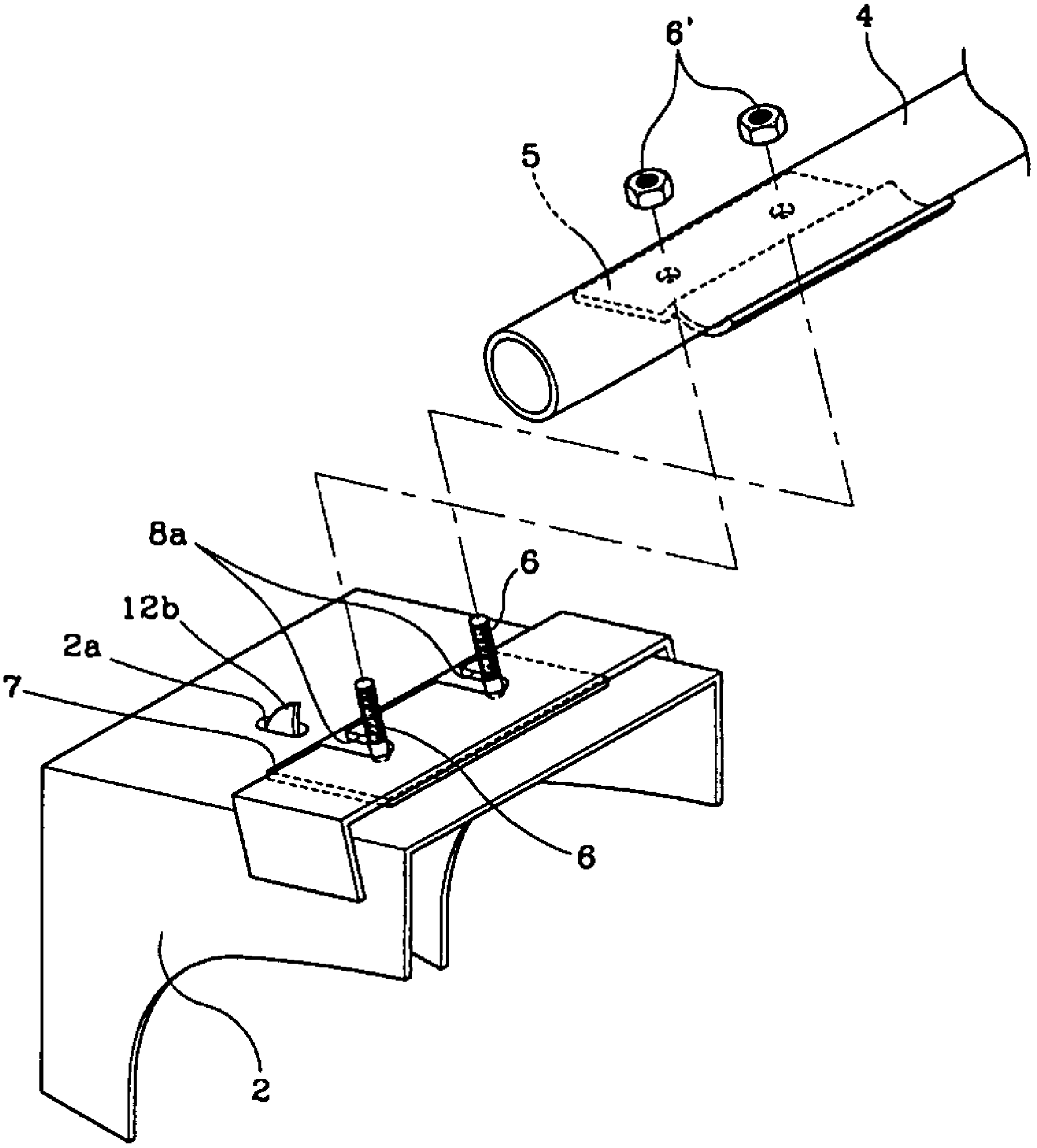
FIG. 3 is a perspective view illustrating the assembly structure of a cowl cross bar and pedal hanger according to an embodiment of the present invention.
Figure 4:
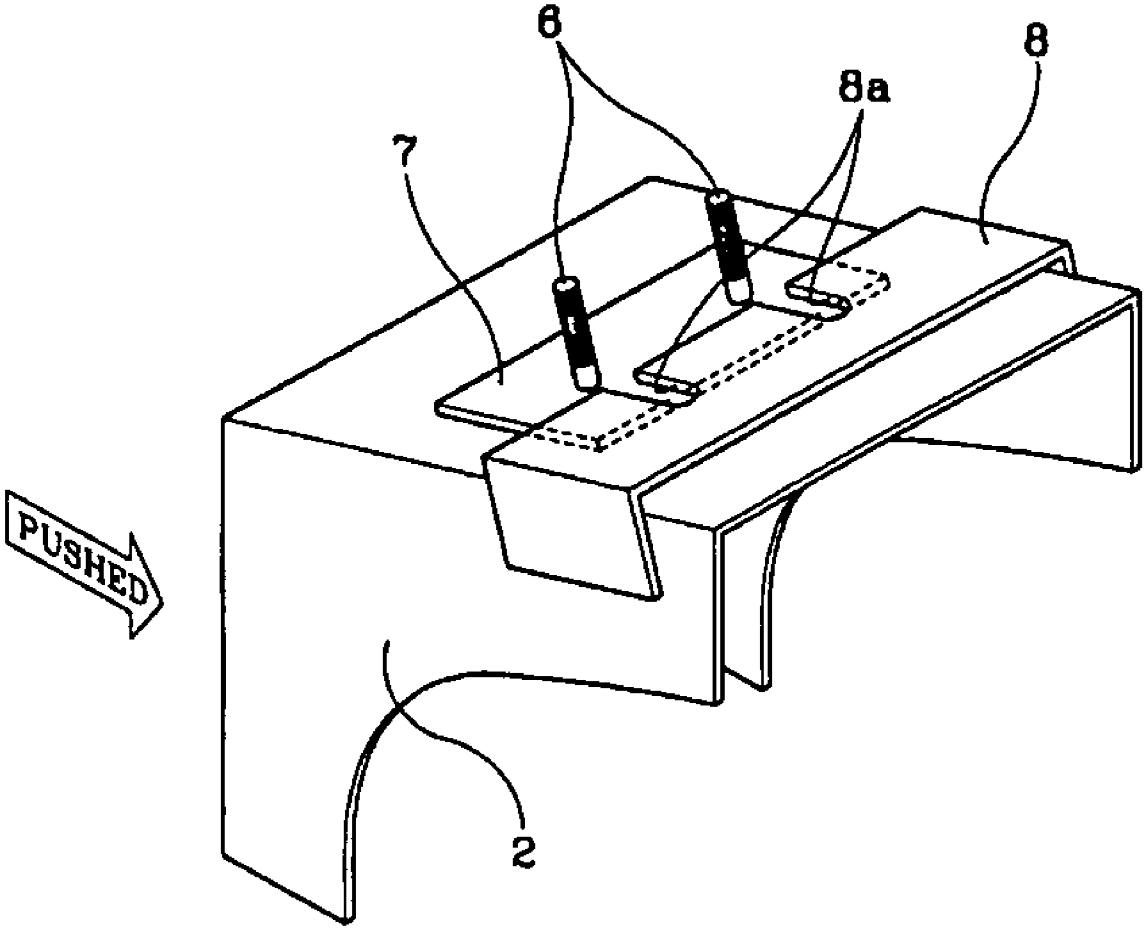
FIG. 4 illustrates a relative disposition of a release bracket and pedal hanger when a vehicle collision occurs.

With reference to FIGS. 3 and 4, a mounting bracket 8 comprises both lateral vertical surfaces and an upper surface connecting the lateral vertical surfaces. Both lateral vertical surfaces of the mounting bracket 8 are connected to the lateral walls of the pedal hanger 2. These connections also may be welds. The upper surface of the mounting bracket 8 is formed with U-shaped grooves 8*a*, which is opened towards the dash panel 1. The mounting bracket 8 is fixed with the fixing bracket 5 via a release bracket 7.

The release bracket 7 is disposed at the bottom of the upper surface of the mounting bracket 8. Bolts 6 integrally formed at the upper surface of the release bracket 7 upwardly protrude out from the upper surface of the mounting bracket 8 through the grooves 8*a* of the mounting bracket 8. The fixing bracket 5 is fastened to the bolts 6 via nuts 6'. That is, the release bracket 7 secures the mounting bracket 8 to the fixing bracket 5 and the connecting force therebetween is generated by the bolts 6 and nuts 6'.

A triangular link 11 is pivotally connected at one end thereof to a push rod 10 of a booster 9 via a pin, wherein the push rod 10 protrudes out into the passenger compartment by passing through the dash panel 1. The triangular link 11 includes three pivot points (A, B, C) generally arranged in a right-angled triangle shape configuration. The right-angled corner of the triangular link 11 is connected with the push rod 10 (pivot point A).

The corner of the horizontal side of the triangular link 11 is pivotally connected to the arm of the brake pedal 3 via a pin (pivot point B). The corner of the vertical side of the triangular link 11 is pivotally connected to a lower end of a linear link 12 (pivot point C). The linear link 12 connects the triangular link 11 and the pin that fixes the upper end of the brake pedal 3 to the pedal hanger 2.

Figure 2:
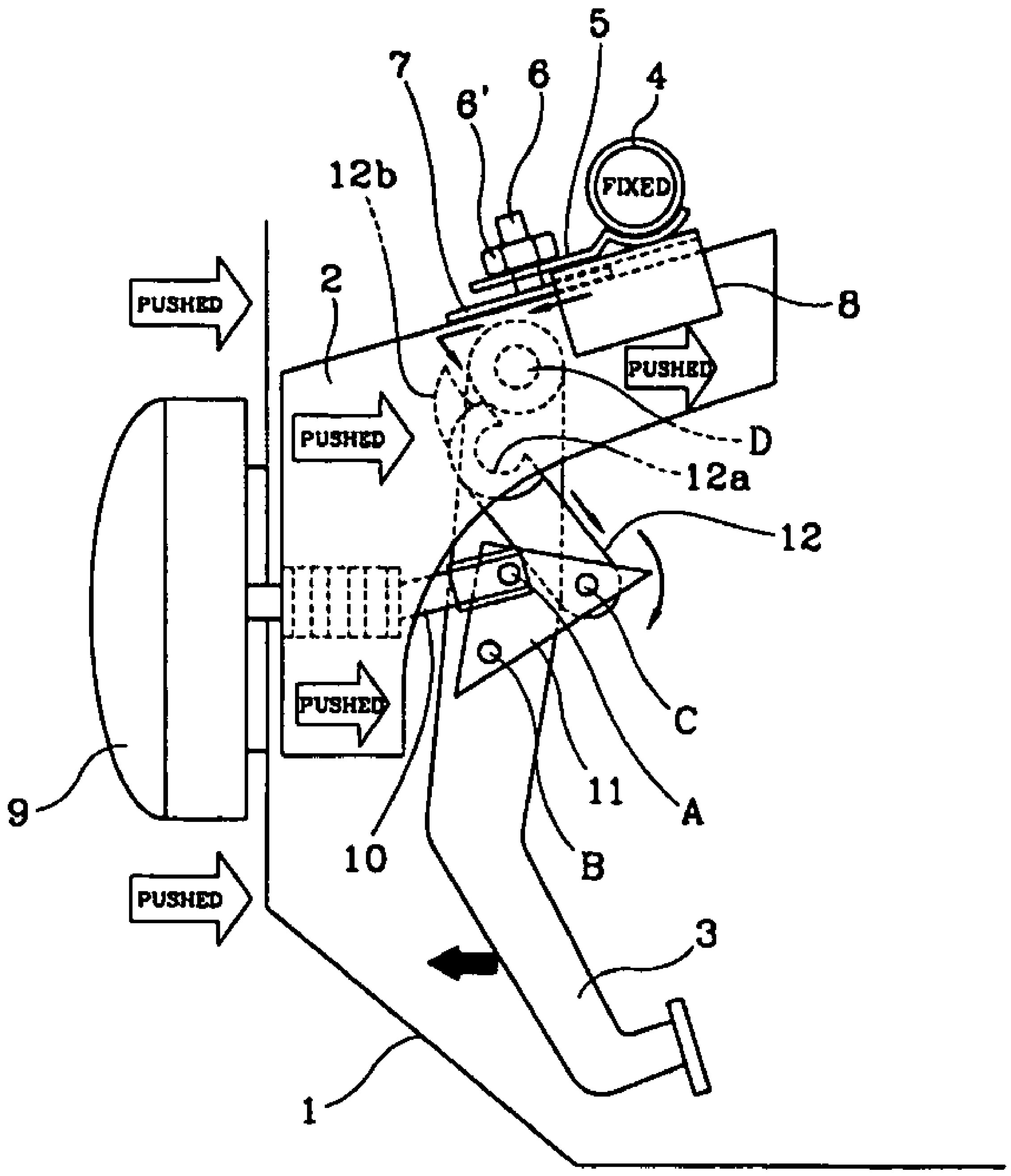
FIG. 2 illustrates an operation state of an embodiment of the present invention when a vehicle collision occurs.

The upper end of the linear link 12 is pivotally fixed with the pin, which fixes the brake pedal 3 (pivot point D). A pin hole 12*a* opens toward the passenger compartment to easily be separated from the pin, i.e. the hole has a semi-circular shape as shown in FIG. 2.

A protrusion 12*b* formed on an upper end of the linear link 12 upwardly protrudes out from the upper surface of the pedal hanger 2 through a hole 2*a* formed at the upper surface of the pedal hanger 2.

The operation of the present invention will now be described in detail.

Under normal driving conditions, the triangular link 11 transmits the manipulation force of the brake pedal 3 to the push rod 10, and the linear link 12 naturally pivots in relation to pivot point D according to the shift of the triangular link 11. The triangular link 11 shifts in response to the pivot of the brake pedal 3. Accordingly, the brake pedal 3 is pivotally manipulated in relation to the pivot point D so as to perform a normal brake pedal function.

In the event of a vehicle collision, the dash panel 1 is pushed toward the passenger compartment, and thus the pedal hanger 2 is also pushed toward the driver. Because the cowl cross bar 4 is fixed to the vehicle body, the disposition of the cowl cross bar 4 does not change in the event of the vehicle collision. The fixing bracket 5 and release bracket 7 fixed to the cowl cross bar 4 are also firmly fixed in their positions. As the mounting bracket 8 is formed with U-shaped grooves 8*a*, which are opened toward the dash panel 1, the bolts 6 do not interfere the movement of the mounting bracket 8. Thus, the pedal hanger 2 is pushed toward the driver according to the amount of impact without interference.

The fixing bracket 5, bolts 6, nuts 6', release bracket 7, and mounting bracket 8 comprise a fixing structure of the upper surface of the pedal hanger 2. This fixing structure firmly fixes the upper surface of the pedal hanger 2 at normal times. If a major collision occurs, pushing the dash panel 1 toward the passenger compartment, then the above structure allows the pedal hanger 2 to be pushed toward the driver without deformation of its configuration. When the pedal hanger 2 shifts toward the passenger compartment thus described, the protrusion 12*b* of the linear link 12 (protruding upward out from the upper surface of the pedal hanger 2) is pushed from the pedal hanger 2 toward the dash panel 1 via the fixed release bracket 7.

When the protrusion 12*b* is pushed via the release bracket 7, the linear link 12 pivots in the counterclockwise direction in relation to the pivot point D and lifts up the pivot point C to pivot the triangular link 11 in the clockwise direction.

If the pedal hanger 2 and dash panel 1 are further pushed toward the driver, the linear link 12 separates from the pivot point D (i.e., the pin hole 12*a* separates from the upper end pin of the brake pedal 3), and the push rod 10 pushes the pivot point A by being pushed by the dash panel 1 such that the triangular link 11 pivots more in the clockwise direction.

In the operation thus described, the pivotal force of the clockwise direction of the triangular link 11 in relation to the pivot point B, and the pushing force via the dash panel 1 bend the push rod 10 upwardly, wherein the pivot point B pivots in relation to the pivot point D of the linear link 12. When the dash panel is pushed more by the above bent angle of the push rod 10, the push rod 10 can easily pivot the triangular link 11 in the clockwise direction. When the linear link 12 descends along the pivot point C and the pivot point B moves towards the dash panel 1, the pivot point B pulls the brake pedal 3 and the brake pedal 3 moves away from the driver.

Thus, the brake pedal 3 is prevented from being pushed toward the driver when a vehicle collision occurs but shifts towards the dash panel 1 (i.e., toward the front of the vehicle). This configuration minimizes or prevents injury to a driver's ankle by decreasing impact transmitted thereto when the driver depresses the brake pedal during a vehicle collision.

As apparent from the foregoing, there is an advantage in that, when the dash panel is pushed toward the passenger compartment due to a vehicle collision, the brake pedal shifts toward the front of the vehicle, thus protecting a driver's ankle by minimizing impact transmitted via the brake pedal.

What is claimed is:

1. A brake pedal structure of a vehicle, comprising:
- a pedal hanger fixed to a dash panel;
- a brake pedal whose upper end is pivotally installed at said pedal hanger via a pin, said brake pedal being depressible in a forward direction by a driver;
- a release bracket fixed to a fixing bracket mounted on to a cowl cross bar;
- a mounting bracket fixed at an upper surface of said pedal hanger, an upper surface of said mounting bracket being placed between said fixing bracket and said release bracket;
- a triangular link having a right-angled triangular shape with a non-hypotenuse side lying substantially horizontal during normal driving conditions, a right-angled corner of said triangular link being pivotally connected to a push rod of a booster, and a lower corner of said triangular link being pivotally connected to said brake pedal; and
- a linear link having a lower end pivotally connected to an upper corner of said triangular link and an upper end pivotally coupled to said pin, and said linear link being configured to separate from said pin when a vehicle collision occurs.

2. The structure as defined in claim 1, wherein a pin hole formed at the upper end of said linear link is open toward the passenger compartment in the vehicle, and said pin hole is coupled to said pin that fixes the upper end of said brake pedal.

3. The structure as defined in claim 1, wherein a protrusion is upwardly formed on the upper end of said linear link, and said protrusion protrudes out upwardly from the upper surface of said pedal hanger through a hole formed at the upper surface of said pedal hanger.

4. A brake pedal structure, comprising:
- a pedal hanger defining a first pivot point;
- a pedal pivotally supported at a first end at the first pivot point and defining a second pivot point between the first end and a second end, said pedal being depressible by a driver;
- a triangle link defining three pivot points arranged in a right triangle configuration including a right angle pivot point, an upper acute angle pivot point, and a lower acute angle pivot point, wherein said lower acute angle pivot point is pivotally secured to the second pivot point on the pedal;

a pushrod configured for cooperation with a vehicle braking system and pivotally secured to the right angle pivot point of the triangle link; and a linear link having upper and lower ends, wherein said lower end is pivotally secured to the upper acute angle pivot point of the triangle link and said upper end is configured with a rearwardly open semi-circle connection that is pivotally received around the first pivot point and releasable therefrom during a vehicle collision.

5. The pedal structure of a claim 4, wherein a mounting bracket is configured for mounting to a vehicle structure such that the pedal hanger is pushed rearward in response to a frontal impact, said rearward push causing disengagement of the linear link from the first pivot point to permit rotation of the triangle link.

6. The pedal structure of claim 5, wherein:

the linear link includes a protrusion above the pedal hanger at the linear link upper end; and a release bracket configured to be fixed to the vehicle structure engages said protrusion to disengage the linear link from the first pivot point.

7. The structure as defined in claim 1, wherein said right-angled corner of said triangular link is at least as high as said lower corner during normal driving conditions, and wherein said upper corner of said triangular link is positioned between said right-angled corner of said triangular link and said pin during normal driving conditions.

8. The structure as defined in claim 4, wherein the right angle pivot point is at least as high as the lower acute angle pivot point during normal driving conditions, and wherein the upper acute angle pivot point is positioned between said right-angle pivot point and said first pivot point during normal driving conditions.

9. A brake pedal structure, comprising:

a pedal hanger defining a first pivot point;

a pedal pivotally supported at a first end directly at the first pivot point and defining a second pivot point between the first end and a second end, said pedal being depressible by a driver;

a triangle link defining three pivot points arranged in a right triangle configuration including a right angle pivot point, an upper acute angle pivot point, and a lower acute angle pivot point pivotally secured to the second pivot point on the pedal;

a pushrod configured for cooperation with a vehicle braking system and pivotally secured to the right angle pivot point of the triangle link; and a linear link having upper and lower ends, wherein said lower end is pivotally secured to the upper acute angle pivot point of the triangle link and said upper end is configured with an open semi-circle connection that is pivotally received around the first pivot point and releasable therefrom during a vehicle collision, wherein the right angle pivot point is at least as high as the lower acute angle pivot point during normal driving conditions, and wherein the upper acute angle pivot point is positioned between said right-angle pivot point and said first pivot point during normal driving conditions.

* * * * *